(12) United States Patent
Sakon et al.

(10) Patent No.: US 7,169,724 B2
(45) Date of Patent: *Jan. 30, 2007

(54) ALUMINA SINTERED BODY AND METHOD FOR PRODUCING THE SAME

(75) Inventors: Atsushi Sakon, Tokai (JP); Toshihiko Suzuki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 127 days.

This patent is subject to a terminal disclaimer.

(21) Appl. No.: 10/997,277

(22) Filed: Nov. 24, 2004

(65) Prior Publication Data

US 2005/0118097 A1    Jun. 2, 2005

(30) Foreign Application Priority Data

Nov. 27, 2003   (JP) .............................. 2003-398206

(51) Int. Cl.
   *C04B 35/10*   (2006.01)
   *C04B 38/00*   (2006.01)
(52) U.S. Cl. ......................... 501/127; 501/80; 204/429
(58) Field of Classification Search ................ 501/127, 501/80; 204/424–429
See application file for complete search history.

(56) References Cited

U.S. PATENT DOCUMENTS

2005/0126910 A1 *  6/2005  Sakon et al. ................ 204/424

FOREIGN PATENT DOCUMENTS

JP           09-068515          3/1997

* cited by examiner

*Primary Examiner*—Karl Group
(74) *Attorney, Agent, or Firm*—Burr & Brown

(57) ABSTRACT

An alumina sintered body having communicating pores of 400–1100 Å in average pore diameter and 4–16% in porosity and being obtainable by mixing first alumina particles 1 having a particle diameter of 0.2–0.7 μm and a sphericity of 0.7–1.0 as an aggregate and second alumina particles having a particle diameter of 0.01–0.1 μm as a pore forming material to embed a plurality of the second alumina particles 2 in the spaces between the first alumina particles 1, and sintering the mixture at a temperature of 1200–1400° C. The alumina sintered body can be used for a part for various gas permeable industrial materials inclusive of protective film for gas sensors, and the like.

2 Claims, 5 Drawing Sheets

FIG.3
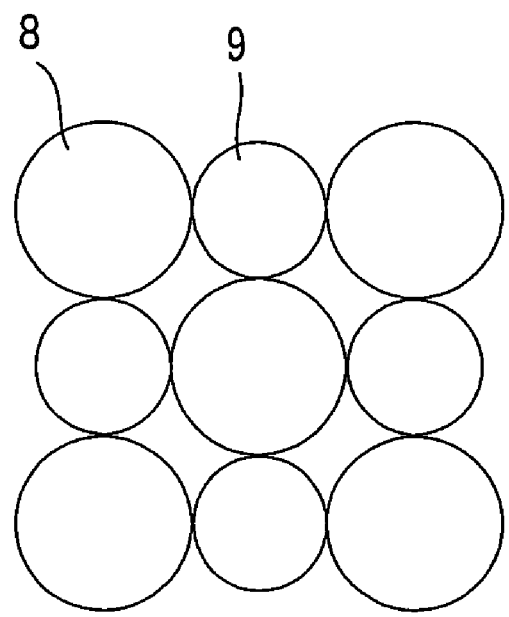
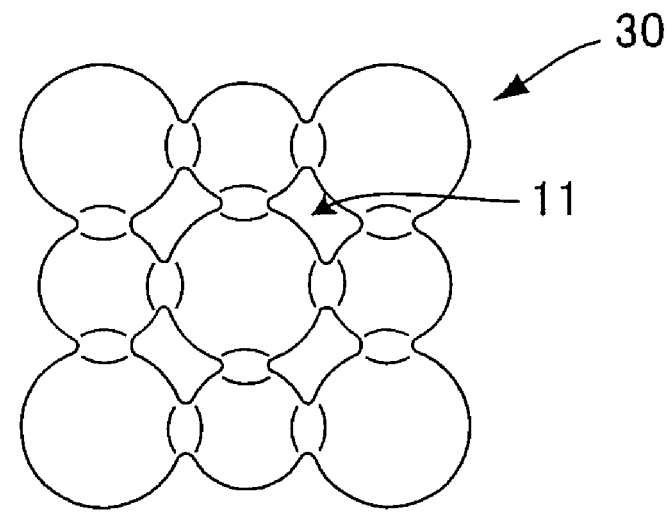

ALUMINA SINTERED BODY AND METHOD FOR PRODUCING THE SAME

CROSS REFERENCE TO RELATED APPLICATION

This application claims the benefit of Japanese Application 2003-398206, filed Nov. 27, 2003, the entirety of which is incorporated herein by reference.

BACKGROUND OF THE INVENTION

1. Field of the Invention

The present invention relates to a gas permeable (hereinafter sometimes referred to as "porous") alumina sintered body having communicating pores, and a method for producing the same. More particularly, it relates to a porous alumina sintered body in which characteristics of the communicating pores, such as pore diameter and porosity, are accurately controlled to desired ranges and which is suitably usable as various gas permeable industrial materials, e.g., electrode protective layers for measurement electrodes of gas sensors, filters of dust collectors, etc., and a method for efficient production of the alumina sintered body.

2. Description of the Prior Art

Porous alumina sintered bodies are suitably used as various gas permeable industrial materials, e.g., electrode protective layers for measurement electrodes of gas sensors, filters of dust collectors, etc. The gas sensors include, for example, oxygen sensors used for measuring oxygen concentration in exhaust gases of automobiles to detect the combustion state in the engines (JP-A-9-68515).

Recently, for the improvement of performance of automobiles, it is attempted not only to enhance performance of engines, but also to add various additives such as phosphorus, zinc, magnesium and calcium to engine oil or gasoline. However, if these additives mingle into exhaust gases, they stick to the surface of oxygen sensor to clog the communicating pores of the diffusion resistant layer or stick to the measuring electrode in a measuring chamber to deteriorate the electrode, resulting in reduction of output of the sensor or reduction of responsiveness. Moreover, the porous alumina sintered body is produced, for example, by coating and drying a slurry having a proper viscosity and thereafter sintering the coat, and there are caused considerable variations in pore diameter and porosity of the resulting alumina sintered body (electrode protective layer), and the gas output yield is not stabilized. Furthermore, since the gas to be measured must permeate the electrode protective layer and reach the electrode to output an electrical signal, the layer is required to have uniform porosity higher than a specific value, and, besides, in order to inhibit deterioration of the measuring electrode caused by the effect of the additives in the gas, the layer is required to have a uniform pore diameter smaller than a specific value. In other words, the electrode protective layer is required to have intermediate physical properties between those of porous body and dense body.

At present, there have not yet been obtained porous alumina bodies in which pore characteristics of the communicating pores, such as pore diameter and porosity, are accurately controlled to desired ranges.

SUMMARY OF THE INVENTION

The present invention has been accomplished in an attempt to solve the above problems, and the object of the present invention is to provide a porous alumina sintered body in which characteristics of the communicating pores, such as pore diameter and porosity, are accurately controlled to desired ranges and which are usable suitably as various gas permeable industrial materials, e.g., electrode protective layers for measuring electrodes of gas sensors, filters of dust collectors, etc., and a method for efficiently producing the alumina sintered body.

BRIEF DESCRIPTION OF THE DRAWINGS

FIG. 3 schematically shows behavior of aggregates and pore forming materials in an embodiment of the present invention [the third production method (aggregate blending method)].

Figure 1:
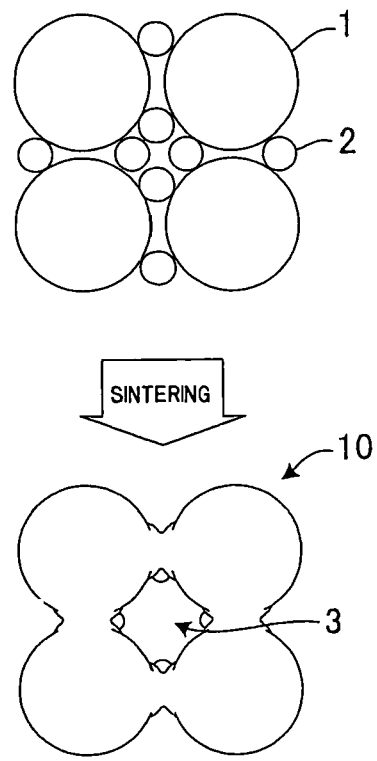
FIG. 1 schematically shows behavior of aggregates and pore forming materials in an embodiment of the present invention [the first production method (interparticle embedding method)].

In the drawings, the reference numerals have the following meanings:

1—The first alumina particles, 2—The second alumina particles, 3—Communicating pores, 4—The third alumina particles, 5—Composite material, 6—Composite material bonding layer, 7—Communicating pores, 8—The fourth alumina particles, 9—The fifth alumina particles, 10—Alumina sintered body obtained by the first production method, 11—Communicating pores, 20—Alumina sintered body obtained by the second production method, 30—Alumina sintered body obtained by the third production method.

DESCRIPTION OF THE INVENTION

As a result of an intensive research conducted by the inventors for attaining the above object, it has been found that variations in pore diameter and porosity are caused by instability of dispersion due to cohesion of aggregate and pore forming material during mixing, and adjustment and control of the degree of sintering properties (e.g., densification) at sintering are essential for accurate control of the characteristics such as pore diameter and porosity, and the above object can be attained by using in combination aggregate and pore forming material having uniform particle diameter and uniform shape, and furthermore by combining the aggregate and the pore forming material differing in degree of sintering properties. Thus, the present invention has been accomplished. That is, the present invention provides the following alumina sintered body and the following method for producing the same.

(1) A gas permeable alumina sintered body having a plurality of communicating pores which is obtained by sintering alumina particles as an aggregate in the presence of a pore forming material, said communicating pores having an average pore diameter of 400–1100 Å and a porosity of 4–16%.

(2) An alumina sintered body described in the above (1), wherein the pore distribution (distribution width of pore diameter) of the communicating pores is 300–1100 Å.

(3) A method for producing a gas permeable alumina sintered body having a plurality of communicating pores which comprises mixing first alumina particles having a particle diameter of 0.2–0.7 µm and a sphericity of 0.7–1.0 as an aggregate and second alumina particles having a particle diameter of 0.01–0.1 µm as a pore forming material to embed a plurality of the second alumina particles in the spaces between the first alumina particles, and sintering the mixture at a temperature of 1200–1400° C., thereby obtaining an alumina sintered body having the communicating pores of 400–1100 Å in average pore diameter and 4–16% in porosity.

(4) A method for producing an alumina sintered body as described in the above (3), wherein the pore distribution (distribution width of pore diameter) of the alumina sintered body obtained is 300–1100 Å.

(5) A method for producing an alumina sintered body as described in the above (4), wherein the second alumina particles are mixed in an amount of 0.2–1.5% by mass based on the first alumina particles.

(6) A method for producing a gas permeable alumina sintered body having a plurality of communicating pores which comprises sintering third alumina particles having a particle diameter of 0.2–0.7 µm and a sphericity of 0.7–1.0 as an aggregate at a temperature of 1200–1400° C. in the presence of a composite material containing silicon dioxide ($SiO_2$) and magnesium oxide (MgO) as a pore forming material to bond the third alumina particles to each other through a layer of the composite material, thereby obtaining an alumina sintered body having the communicating pores of 400–1100 Å in average pore diameter and 4–16% in porosity.

(7) A method for producing an alumina sintered body as described in the above (6), wherein the composite material is mixed in an amount of 0.02–2% by mass based on the third alumina particles.

(8) A method for producing an alumina sintered body as described in the above (6) or (7), wherein the pore distribution (distribution width of pore diameter) of the alumina sintered body obtained is 300–1100 Å.

(9) A method for producing a gas permeable alumina sintered body having a plurality of communicating pores which comprises mixing fourth alumina particles having a particle diameter of 0.3–1.0 µm and a sphericity of 0.7–1.0 as an aggregate and fifth alumina particles having a particle diameter of 0.2–0.8 µm as a pore forming material to insert the fifth alumina particles into the spaces between the fourth alumina particles and sintering the mixture at a temperature of 1200–1400° C., thereby obtaining an alumina sintered body having the communicating pores of 400–1100 Å in average pore diameter and 4–16% in porosity.

(10) A method for producing an alumina sintered body as described in the above (9), wherein the pore distribution (distribution width of pore diameter) of the alumina sintered body obtained is 300–1100 Å.

(11) A method for producing an alumina sintered body as described in the above (9) or (10), wherein the fifth alumina particles are mixed in an amount of 50–95% by mass based on the fourth alumina particles.

According to the present invention, there are provided a porous alumina sintered body in which characteristics of the communicating pores, such as pore diameter and porosity, are accurately controlled to desired ranges and which is suitably usable as various gas permeable industrial materials, e.g., electrode protective layers for measurement electrodes of gas sensors, filters of dust collectors, etc., and a method for efficient production of the said alumina sintered body.

DESCRIPTION OF THE PREFERRED EMBODIMENTS

Embodiments of the alumina sintered body and the method for producing the same according to the present invention will be explained in detail below referring to the drawings.

The embodiment of the alumina sintered body of the present invention is a gas permeable alumina sintered body having a plurality of communicating pores which is obtained by sintering alumina particles as an aggregate in the presence of a pore forming material, characterized in that the average particle diameter of the communicating pores is 400–1100 Å, preferably 500–900 Å, and the porosity thereof is 4–16%, preferably 9–14%. If the pore diameter is outside the range of 400–1100 Å, when the alumina sintered body is used, for example, as an electrode protective layer for a measurement electrode of a gas sensor, endurance of the layer is deteriorated due to the influence of gasoline additives mingled into exhaust gas and gas output reduction rate (%) increases. If the porosity is outside the range of 4–16%, when the alumina sintered body is used, for example, as an electrode protective layer, inflow rate of the gas into the measurement electrode varies to result in unstable yield of gas output.

In this embodiment, the pore distribution (distribution width of pore diameter) of the communicating pores is preferably 300–1100 Å, more preferably 500–900 Å. If the pore distribution is more than 1100 Å, the gas output reduction rate (%) increases and, furthermore, the yield of gas output sometimes becomes unstable.

The alumina particles, pore forming material and sintering method will be explained with reference to the method for production of alumina sintered body stated hereinafter.

The shape of the alumina sintered body of this embodiment is not particularly limited, and it may be in the form of, for example, a film or layer of 15–100 µm in thickness, a block, or the like.

Next, the method for producing the alumina sintered body according to the present invention (the first to third production methods) will be explained. The term "sphericity" is shown by r1/r2 in which r1 is a minor diameter of an ellipse and r2 is a major diameter of an ellipse. When "r1/r2" is 1, it means the true sphere. This definition will be applied hereinafter.

As shown in FIG. 1, the first production method (hereinafter sometimes referred to as "interparticle embedding method") is a method for producing a gas permeable alumina sintered body having a plurality of communicating pores and is characterized in that an alumina sintered body 10 in which the communicating pores 3 have an average pore diameter of 400–1100 Å, preferably 500–900 Å and a porosity of 4–16%, preferably 9–14% is obtained by mixing the first alumina particles 1 having a particle diameter of 0.2–0.7 μm, preferably 0.3–0.5 μm and a sphericity of 0.7–1.0, preferably 0.8–1.0, as an aggregate and the second alumina particles 2 having a particle diameter of 0.01–0.1 μm, preferably 0.01–0.05 μm, as a pore forming material to embed a plurality of the second alumina particles 2 in the spaces between the first alumina particles 1, and sintering the mixture at a temperature of 1200–1400° C., preferably 1300–1380° C.

If the particle diameter of the first alumina particles 1 is outside the range of 0.2–0.7 μm, and the sphericity is outside the range of 0.7–1.0, cohesiveness of the first alumina particles 1 increases or the sintering becomes insufficient, resulting in variation in pore diameter and porosity of the alumina sintered body 10 obtained by the sintering.

If the particle diameter of the second alumina particles 2 is outside the range of 0.01–0.1 μm, the sintering degree of the second alumina particles 2 at the time of sintering is outside the preferred range, resulting in variation in pore diameter and porosity of the alumina sintered body 10 obtained by the sintering. In this sense, the sphericity of the second alumina particles 2 is also preferably 0.7–1.0, more preferably 0.8–1.0. Furthermore, if the sintering temperature is outside the range of 1200–1400° C., the sintering becomes insufficient or excessive, and the necessary pore characteristics cannot be obtained.

In one embodiment of a production method of the present invention, the pore distribution (distribution width of pore diameter) is preferably 300–1100 Å, more preferably 500–1100 Å. If the pore distribution is outside this range, there occurs a deterioration in the function to trap contaminants (gasoline additives, etc.) and a reduction in gas permeability.

The first alumina particles 1 and the second alumina particles 2 are not particularly limited so long as they have the particle diameter and sphericity in the above ranges and have uniform particle diameter and uniform shape, and examples of the alumina particles are α-alumina, γ-alumina, and the like.

As a specific method for mixing the first alumina particles 1 and the second alumina particles 2 to embed a plurality of the second alumina particles 2 in the spaces between the first alumina particles 1, mention may be made of, for example, a method of coating a slurry prepared by dispersing the mixed alumina in an organic binder solution or a method of compacting the mixed alumina. In this case, the mixing ratio of the first alumina particles 1 and the second alumina particles is such that the second alumina particles 2 are mixed in an amount of preferably 0.2–1.5% by mass, more preferably 0.3–1.0% by mass, based on the first alumina particles 1.

The sintering method is not particularly limited, and there is a method of, for example, heating the formed film or particle compact in an atmosphere.

In one embodiment of a production method of the present invention, the particle diameter, sphericity, pore diameter, porosity and pore distribution (distribution width of pore diameter) can be measured as mentioned below.

Particle diameter (by using a laser diffraction type particle size distribution measuring apparatus).

Sphericity (by measuring major diameter and minor diameter of particles by SEM).

Average particle diameter (by using a mercury penetration type pore distribution measuring apparatus).

Porosity (by using a mercury penetration type pore distribution measuring apparatus).

Pore distribution (distribution width of particle diameter) (by using a mercury penetration type pore distribution measuring apparatus).

Figure 2:
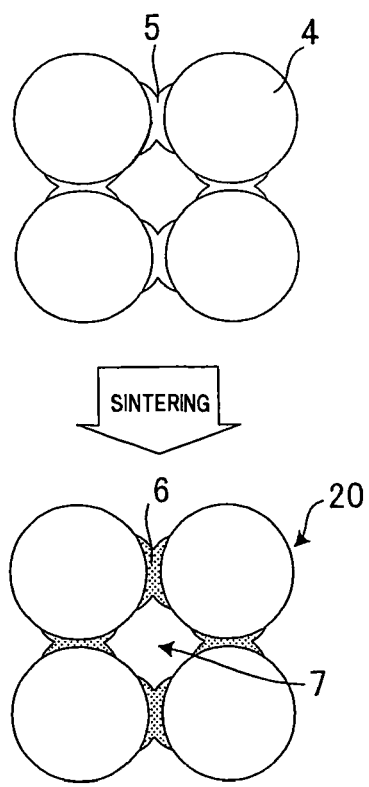
FIG. 2 schematically shows behavior of aggregates and pore forming materials in an embodiment of the present invention [the second production method (interparticle bonding method)].

As shown in FIG. 2, the second production method (hereinafter sometimes referred to as "interparticle bonding method") is a method for producing a gas permeable alumina sintered body having a plurality of communicating pores and is characterized in that an alumina sintered body 20 in which the communicating pores 7 have a pore diameter of 400–1100 Å, preferably 500–900 Å, and a porosity of 4–16%, preferably 9–14%, is obtained by sintering the third alumina particles 4 having a particle diameter of 0.2–0.7 μm, preferably 0.3–0.5 μm, and a sphericity of 0.7–1.0, preferably 0.8–1.0, as an aggregate at a temperature of 1200–1400° C., preferably 1300–1380° C., in the presence of the composite material 5 containing silicon dioxide ($SiO_2$) and magnesium oxide (MgO) as a pore forming material to bond the third alumina particles 4 to each other through a layer of the composite material 5 (composite material bonding layer 6).

If the particle diameter of the third alumina particles 4 is outside the range of 0.2–0.7 μm, and the sphericity is outside the range of 0.7–1.0, cohesiveness of the third alumina particles 4 increases or the sintering degree becomes insufficient, resulting in variation in pore diameter and porosity of the alumina sintered body 20 obtained by the sintering.

The composite material 5 is not particularly limited so long as it contains silicon dioxide ($SiO_2$) and magnesium oxide (MgO), such as $SiO_2$+MgO+CaO and $SiO_2$+MgO+BaO, for example. The composite material 5 is mixed in an amount of preferably 0.02–2% by mass, more preferably 0.05–1% by mass based on the third alumina particles 4.

In another embodiment of a production method of the present invention, the pore distribution (distribution width of pore diameter) of the alumina sintered body 20 obtained is preferably 400–1100 Å, more preferably 500–900 Å. If the pore distribution is outside this range, there occurs deterioration in the function to trap contaminants (gasoline additives, etc.) and a reduction in gas permeability.

The third alumina particles 4 are not particularly limited so long as they have the particle diameter and sphericity in the above ranges and have uniform particle diameter and uniform shape, and examples of the alumina particles are α-alumina, γ-alumina, and the like.

One specific method for mixing the third alumina particles 4 with the composite material 5 and bonding the third alumina particles 4 to each other through a layer of the composite material 5 (composite material bonding layer 6), mention may be made of, for example, a method of coating a slurry prepared by dispersing the mixture of the alumina and the composite material component in an organic binder solution or a method of compacting the mixture of the alumina and the composite material component.

The sintering method is not particularly limited, and there is a method of, for example, heating the coated film or particle compact in the atmosphere.

In this embodiment, the particle diameter, sphericity, pore diameter, porosity and pore distribution (distribution width of pore diameter) can be measured in the same manner as in the first production method (interparticle embedding method).

As shown in FIG. 3, the third production method (hereinafter sometimes referred to as "aggregate blending method") is a method for producing a gas permeable alumina sintered body having a plurality of communicating pores and is characterized in that an alumina sintered body 30 in which the communicating pores 11 have an average pore diameter of 400–1100 Å, preferably 500–900 Å, and a porosity of 4–16%, preferably 9–14%, is obtained by mixing the fourth alumina particles 8 having a particle diameter of 0.3–1.0 μm, preferably 0.4–0.7 μm, and a sphericity of 0.7–1.0, preferably 0.8–1.0, as an aggregate and the fifth alumina particles 9 having a particle diameter of 0.2–0.8 μm, preferably 0.3–0.5 μm, as a pore forming material to insert the fifth alumina particles 9 into the spaces between the fourth alumina particles 8, and sintering the mixture at a temperature of 1200–1400° C.

If the particle diameter of the fourth alumina particles 8 is outside the range of 0.3–1.0 μm, and the sphericity is outside the range of 0.7–1.0, cohesiveness of the fourth alumina particles 8 increases or the sintering degree becomes insufficient, resulting in variation in pore diameter and porosity of the alumina sintered body 30 obtained by the sintering.

If the particle diameter of the fifth alumina particles 9 is outside the range of 0.2–0.8 μm, the sintering degree of the fifth alumina particles 9 at the time of sintering is outside the preferred range, resulting in variation in pore diameter and porosity of the alumina sintered body 30 obtained by the sintering. In this sense, the sphericity of the fifth alumina particles 9 is also preferably 0.7–1.0, more preferably 0.8–1.0. Furthermore, if the sintering temperature is outside the range of 1200–1400° C., the sintering becomes insufficient or excessive, and the necessary pore characteristics cannot be obtained.

In yet another embodiment of a production method of the present invention, the pore distribution (distribution width of pore diameter) of the alumina sintered body 30 obtained is preferably 400–1100 Å, more preferably 500–900 Å. If the pore distribution is outside this range, there occurs deterioration in the function to trap contaminants (gasoline additives, etc.) and a reduction in gas permeability.

The fourth alumina particles 8 and the fifth alumina particles 9 are not particularly limited so long as they have the particle diameter and sphericity in the above ranges and have uniform particle diameter and uniform shape, and examples of the alumina particles are α-alumina, γ-alumina, and the like.

As a specific method for mixing the fourth alumina particles 8 and the fifth alumina particles 9 to insert the fifth alumina particles 9 in the spaces between the fourth alumina particles 8, such as a method of coating a slurry prepared by dispersing the mixed alumina in an organic binder solution or a method of compacting the mixed alumina, for example. In this case, the mixing ratio of the fourth alumina particles 8 and the fifth alumina particles 9 is such that the fifth alumina particles 9 are mixed in an amount of preferably 50–95% by mass, more preferably 50–90% by mass based on the fourth alumina particles 8.

The sintering method is not particularly limited, and there is a method of, for example, heating the coated film or particle compact in the atmosphere.

In the third production method, the particle diameter, sphericity, pore diameter, porosity and pore distribution (distribution width of pore diameter) can be measured in the same manner as in the first production method (interparticle embedding method).

The difference between the first production method (interparticle embedding method) and the third production method (aggregate blending method) resides in the size of the second alumina particles 2 and that of the alumina particles 9.

EXAMPLE

The present invention will be explained specifically in the following examples, which should not be construed as limiting the invention in any manner.

Example 1

Example of the first production method:

To a raw material powder comprising the first alumina particles 1 was added a slurry containing a dispersion medium (e.g., ethanol), a dispersant and the second alumina particles 2, followed by mixing them. Then, to the mixture was added a solution (hereinafter referred to as "organic binder solution") prepared by previously dissolving an organic binder (e.g., ethyl cellulose) and a plasticizer in a solvent (e.g., terpineol), followed by further mixing them, and a paste obtained by adjusting the viscosity of the mixture by removing the dispersion medium and further adding the solvent was formed into a film by coating or printing, followed by sintering the film.

Example 2

Example of the second production method:

To a raw material powder comprising the third alumina particles 4 were added a dispersion medium (e.g., ethanol), a dispersant, a source of $SiO_2$ (e.g., silica sol) and a source of MgO (e.g., magnesium acetate), and thereafter the same subsequent procedures as in the above first production method were carried out to obtain a sintered body.

Example 3

Example of the third production method:

To a mixture of a raw material powder comprising the fourth alumina particles 8 and a raw material powder comprising the fifth alumina particles 9 were added a dispersion medium (e.g., ethanol) and a dispersant, and thereafter the same subsequent procedures as in the above first production method were carried out to obtain a sintered body.

Comparative Example 1

Comparative example of a conventional production method:

To a mixture of a raw material powder comprising conventional alumina particles and an aluminum salt (e.g., aluminum hydroxide) were added a dispersion medium (e.g., ethanol) and a dispersant, and thereafter the same subsequent procedures as in the above first production method were carried out to obtain a sintered body.

(Evaluation)

Table 1 shows particle diameter, shape, mixing ratio and sintering temperature of the materials (aggregate and pore forming material) used in Examples 1–3 and Comparative Example 1, and pore diameter, porosity and pore distribution (distribution width of pore diameter) of the alumina sintered bodies obtained in Examples 1–3 and Comparative Example 1. As shown in Table 1, the pore diameter, porosity and pore distribution (distribution width of pore diameter) of the alumina sintered bodies obtained in Examples 1–3 were more accurately controlled than those of the alumina sintered body obtained in Comparative Example 1.

TABLE 1

| | Example 1 | Example 2 | Example 3 | Comparative Example 1 |
|---|---|---|---|---|
| Particle diameter of aggregates (μm) | 0.4 | 0.4 | 0.4 & 0.5 | 0.2 |
| Shape of aggregates (sphericity) | 0.85 | 0.85 | 0.9 & 0.85 | 0.6 |
| Mixing ratio (amount of addition) | 0.5 wt. % of particles having size of 0.01 μm | 0.06 wt. % of MgO + SiO$_2$ | 0.4 μm: 80 wt. % 0.5 μm: 20 wt. % | 7 wt. % of aluminum hydroxide |
| Sintering temperature (° C.) | 1365 | 1365 | 1365 | 1365 |

Figure 4:
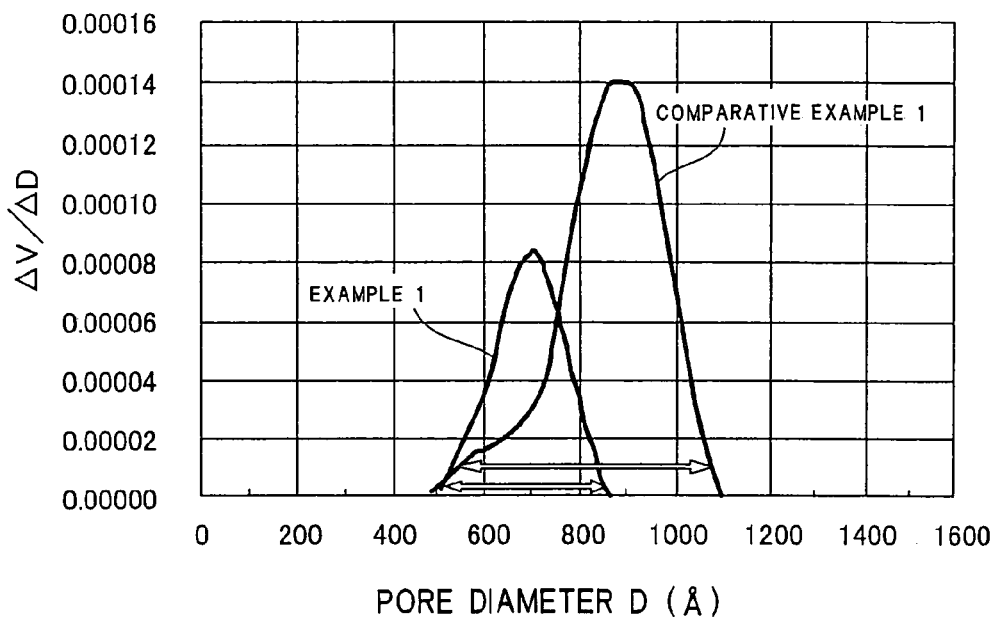
FIG. 4 is a graph which shows a comparison on pore distribution (distribution width of pore diameter) of the alumina sintered body obtained in Example 1 and that of the alumina sintered body obtained in Comparative Example 1.

FIG. 4 shows a comparison on the pore distribution (distribution width of pore diameter) of the alumina sintered body obtained in Example 1 and the alumina sintered body obtained in Comparative Example 1. As can be seen from FIG. 4, the pore distribution (distribution width of pore diameter) of the alumina sintered body obtained in Example 1 was about ½ of the pore distribution of the alumina sintered body obtained in Comparative Example 1.

Figure 5:
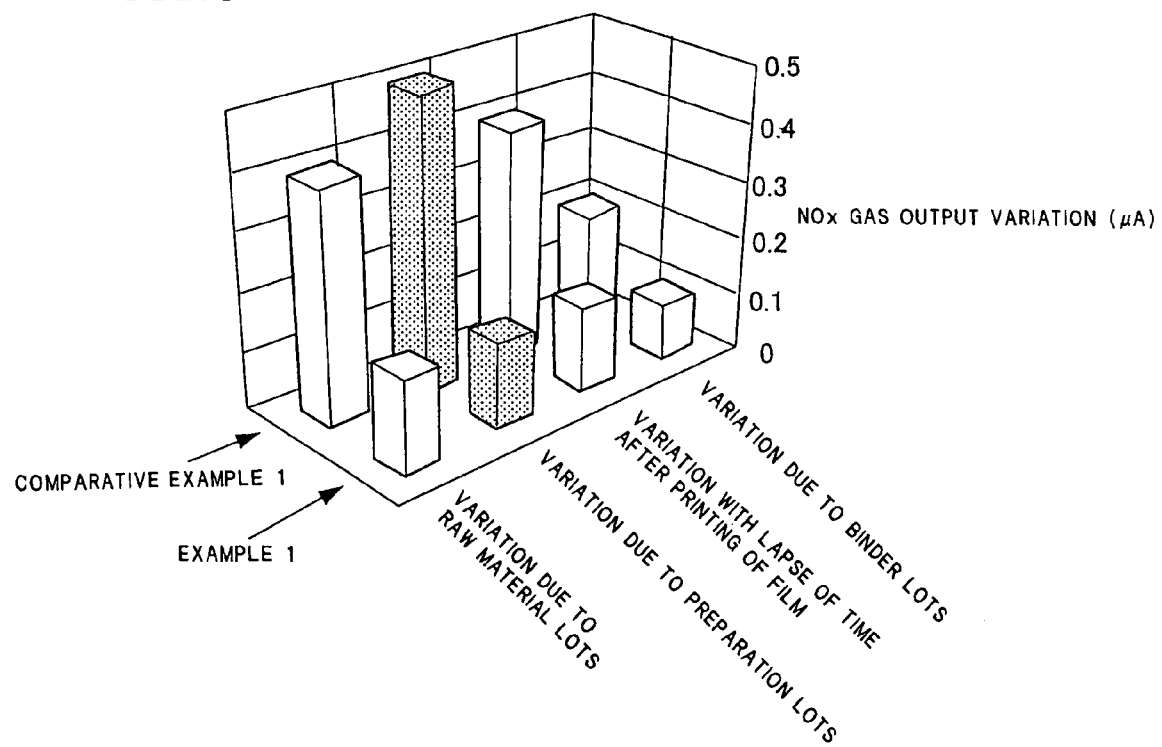
FIG. 5 is a graph which shows comparison on variation due to binder lots, variation with lapse of time after printing of film, variation due to preparation lots, and variation due to raw material lots when the alumina sintered body obtained in Example 1 and the alumina sintered body obtained in Comparative Example 1 were used as an electrode protective layer for measurement electrode of a gas sensor (NOx gas sensor).

FIG. 5 shows comparisons on variation due to binder lots, variation with lapse of time after printing of film, variation due to preparation lots, and variation due to raw material lots when the alumina sintered body obtained in Example 1 and the alumina sintered body obtained in Comparative Example 1 were used as an electrode protective layer for measurement electrode in a gas sensor (NOx gas sensor). As can be seen from FIG. 5, the alumina sintered body obtained in Example 1 was smaller in NOx gas output variation (iA) than the alumina sintered body obtained in Comparative Example 1. The gas sensor was made in the following manner.

A paste which forms a pump electrode was printed on the upper surface of a zirconia (solid electrolyte) sheet S1, and a paste which forms a pump electrode and an auxiliary pump electrode was printed on the under surface of the sheet S1.

Furthermore, a paste which forms a measurement electrode was printed on the upper surface of a zirconia (solid electrolyte) sheet S3, followed by printing the pastes obtained in Example 1 and Comparative Example 1.

Then, a punched zirconia (solid electrolyte) sheet S2 interposed between the zirconia (solid electrolyte) sheet S1 and the zirconia (solid electrolyte) sheet S3 which were subjected to the printing to form a space between the sheets S1 and S3, and the resulting laminate was subjected to cutting and sintering. In this case, an organic paste (binder solution) was coated on a part of the sheet S2 and dried, and thereafter the organic paste was removed at the sintering step, thereby to form gas passages between the sheet S1 and the sheet S2 and between the sheet S2 and the sheet S3.

Figure 6:
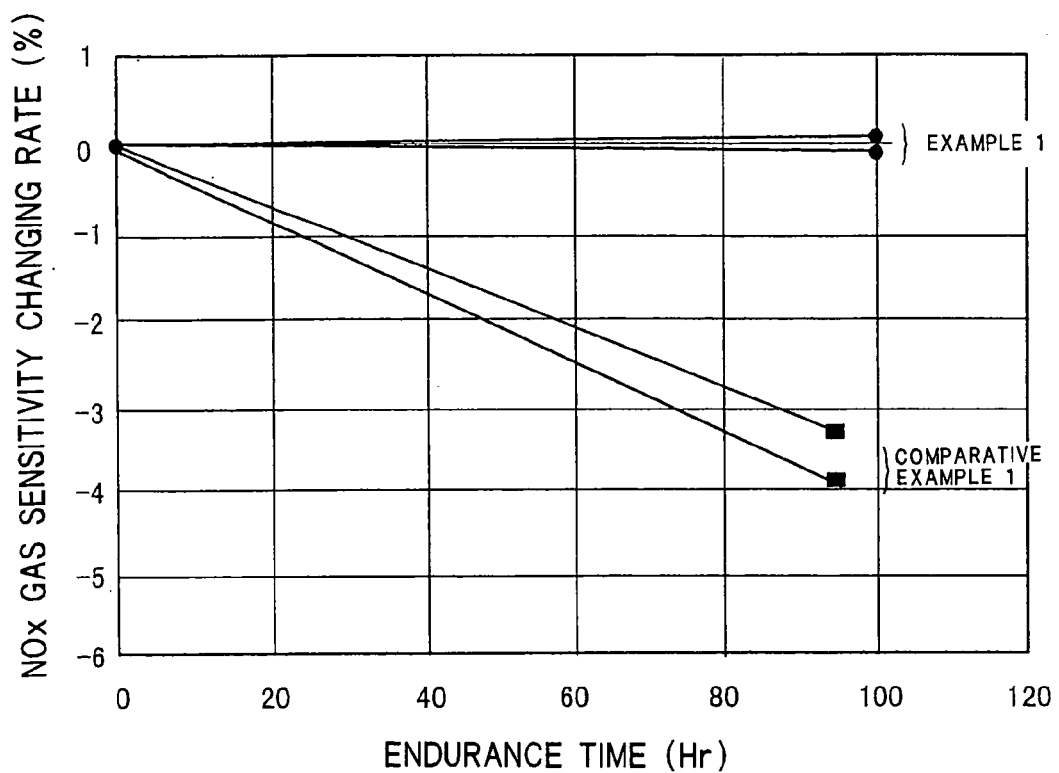
FIG. 6 is a graph which shows comparison of results in continuous endurance test at 950° C. when the alumina sintered body obtained in Example 1 and the alumina sintered body obtained in Comparative Example 1 were used as an electrode protective layer for measurement electrode of a gas sensor (NOx gas sensor).
Figure 7:
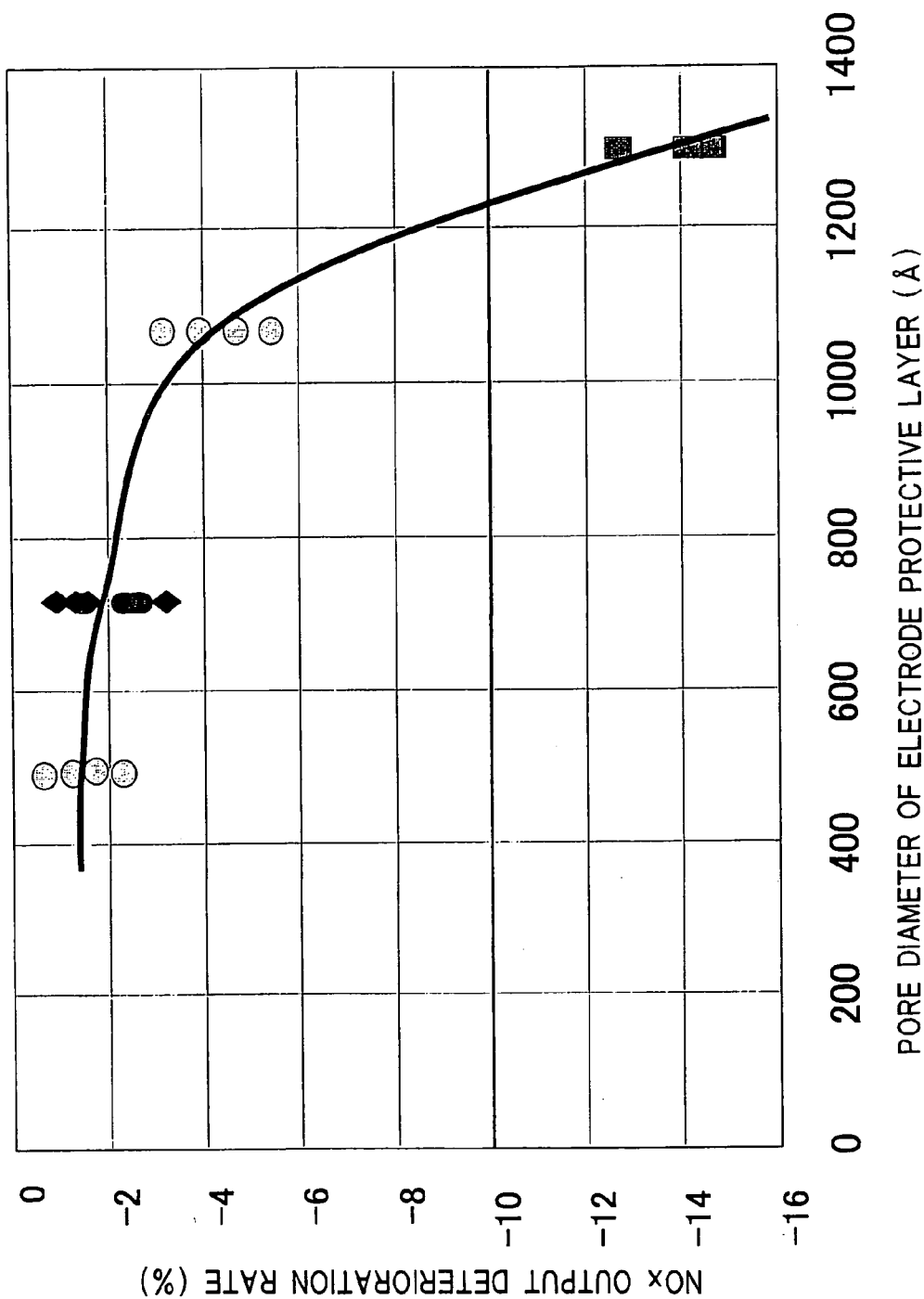
FIG. 7 is a graph which shows relation between pore diameter (Å) of electrode protective layer and NOx gas output reduction rate (%) which is an indicator for high-temperature endurance (degree of poisoning with gold (Au) volatizing or scattering from an auxiliary pump electrode) when a NOx gas sensory provided with a conventional electrode protective layer was operated at 950° C. for 100 hours.

FIG. 6 shows a comparison on the results in a continuous endurance test at 950° C. when the alumina sintered body obtained in Example 1 and the alumina sintered body obtained in Comparative Example 1 were used as an electrode protective layer for measurement electrode of a gas sensor (NOx gas sensor) of the same construction as of FIG. 5. As can be seen from FIG. 6, the alumina sintered body obtained in Example 1 was smaller in NOx gas sensitivity changing rate (%) than the alumina sintered body obtained in Comparative Example 1.

The alumina sintered body of the present invention can be suitably utilized as various gas permeable industrial materials, e.g., electrode protective layers for measurement electrodes of gas sensors, filters of dust collectors, etc.

What is claimed is:

1. A gas permeable alumina sintered body having a plurality of communicating pores which is obtained by sintering alumina particles as an aggregate in the presence of a pore forming material, said communicating pores having an average pore diameter of 400–1100 Å and a porosity of 4–16%.

2. An alumina sintered body according to claim 1, wherein the pore distribution (distribution width of pore diameter) of the communicating pores is 300–1100 Å.

* * * * *